(12) United States Patent
Kamody et al.

(10) Patent No.: US 10,646,093 B2
(45) Date of Patent: May 12, 2020

(54) COUNTER/TABLE TOP CLEANING PAD-SQUEEGEE WIPER COMBINATION AND METHOD OF USE

(71) Applicants: Dennis Kamody, Pittsburgh, PA (US); Candice Kamody-Welsh, Pittsburgh, PA (US)

(72) Inventors: Dennis Kamody, Pittsburgh, PA (US); Candice Kamody-Welsh, Pittsburgh, PA (US)

( * ) Notice: Subject to any disclaimer, the term of this patent is extended or adjusted under 35 U.S.C. 154(b) by 0 days.

(21) Appl. No.: 16/032,778

(22) Filed: Jul. 11, 2018

(65) Prior Publication Data

US 2019/0191954 A1    Jun. 27, 2019

Related U.S. Application Data

(63) Continuation-in-part of application No. 29/631,082, filed on Dec. 27, 2017, now Pat. No. Des. 851,346.

(51) Int. Cl.
| | |
|---|---|
| *A47L 13/12* | (2006.01) |
| *A47L 13/46* | (2006.01) |
| *A47L 13/16* | (2006.01) |
| *A47L 13/11* | (2006.01) |
| *B32B 1/00* | (2006.01) |

(52) U.S. Cl.
CPC .............. *A47L 13/12* (2013.01); *A47L 13/11* (2013.01); *A47L 13/16* (2013.01); *A47L 13/46* (2013.01); *B32B 1/00* (2013.01)

(58) Field of Classification Search
None
See application file for complete search history.

(56) References Cited

U.S. PATENT DOCUMENTS

| | | | | |
|---|---|---|---|---|
| 5,666,685 | A * | 9/1997 | von Grolman | ............ A47L 1/06 15/121 |
| 5,862,562 | A * | 1/1999 | Erken | ........................ A47L 1/06 15/117 |
| 6,243,911 | B1 * | 6/2001 | Varner | ....................... A47L 1/06 15/245 |

* cited by examiner

*Primary Examiner* — Eric W Golightly
(74) *Attorney, Agent, or Firm* — Gary P. Topolosky (57) ABSTRACT

A combination cleaning pad and squeegee wiper tool for cleaning and drying a counter or table top, said tool comprising: (a) a handle component attached to a flat base component at opposed ends of the handle component; (b) a cleaning pad component at least temporarily adhered to a bottom surface of the flat base component; (c) a channel extending along one lateral side of the flat base component; and (d) a squeegee wiper component that extends from the channel at an angle substantially parallel to the flat base component, said cleaning pad component being spaced a set distance from the squeegee wiper component for enabling the squeegee wiper component to dry the counter or table top in a swirling motion without interference from the cleaning pad component.

16 Claims, 7 Drawing Sheets

COUNTER/TABLE TOP CLEANING PAD-SQUEEGEE WIPER COMBINATION AND METHOD OF USE

RELATED APPLICATION

This application is a continuation-in-part of pending U.S. design application Ser. No. 29/631,082, filed on Dec. 27, 2017, the disclosure of which is fully incorporated herein.

BACKGROUND OF THE INVENTION

1. Field of the Invention

This invention addresses the cleaning of horizontal hard/smooth surfaces like those found kitchen or restaurant counter tops and tables, including those made from granite, quartz, marble, stone, glass, wood, plastic and/or Formica®.

When a counter or table top is wet, sticky or tacky to the touch, or appears smeary or cloudy to the eye, either that surface needs to be cleaned or was poorly cleaned and needs to be redone. Unclean surfaces may harbor dirt, germs, viruses, bacteria, staph, strep, *E-coli, salmonella* and/or undesirable chemicals. When seated in a restaurant, one may find his/her sticking to the table top. That causes the patron to question whether that table was cleaned at all or just poorly cleaned. Another example is after cleaning one's own kitchen counter or table top, the supposedly cleaned surface appears smeary, cloudy or dull. Sometimes, the darker the color or higher the luster or shine to the surface (counter or table top), the more difficult it is to provide that surface with a visually clean appearance.

Highly polished granite surfaces are very difficult to clean. A similar problem is experienced when cleaning window glass. Washing with a sponge then wiping dry with a cloth or paper towel may leave the surface with a streaky, smeary appearance. For window cleaning, one common practice uses a squeegee to first wipe the surface effectively followed by drying with a cloth of paper towel to absorb any displaced moisture from the squeegee action. But using a squeegee to wipe dry a counter or tabletop is not commonly considered.

This invention solves a problem by easily and effectively cleaning a counter/table top that is wet, sticky or tacky to the touch, or otherwise smeary or cloudy to the eye. It employs one cleaning tool that combines a cleaning pad and squeegee into a trowel that enables its user to simulate a natural wrist controlled, hand-held gliding/swirling action, like that often associated with using a hand-held sponge, wash rag or paper towel. This device also allows a scrubbing action, along with a quick flick in the wrist for surface drying.

2. Relevant Art

In comparing the numerous prior art references listed on the Invention Disclosure Statement submitted herewith, it was noted that none of that art can simulate a natural hand-held action of swirling or gliding across a horizontal table or counter top surface to achieve a comfortable "flick of the wrist" movement between washing and drying with a trowel-like handled device having both a sponge and a squeegee component. Most of the references showed using a stick-like handle that runs perpendicular to the squeegee plane. They would require a flip-over, twisting-turning rotation of usually 180 degrees between washing and drying operations. Others do not use any handle but are rather held by a sponge body. No prior art was found that uses a handle running substantially parallel to the squeegee plane.

The relevant, yet clearly distinguishable prior art from Applicants' IDS include (in chronological order): U.S. Pat. Nos. 947,147, 1,655,085, 1,761,180, 1,778,121, 1,924,386, 2,155,462, 2,262,166, 2,658,218, 2,663,889, 2,715,745, 2,818,593, 2,842,789, 3,526,918, 4,381,575, 4,455,705, 5,429,678, 5,666,685, 5,920,947, 6,126,756, 6,243,911 and 7,533,433.

The typical method for cleaning a hard, flat counter top made from granite, quartz or stone is by hand. The three-step method entails: Step 1, applying a cleaning agent to the counter top, either by spraying or wiping on. Step 2 then washes the whole surface with applied agent using a sponge or dish rag, in a repeated swirling/gliding motion, until any surface debris is pulled away from the counter top and left behind in a puddle of used cleaning agent. The drying for Step 3 starts by first wiping up the spent (or used) cleaning agent with a wrung or squeezed-out sponge/dish rag, followed by surface drying with a fresh paper towel and the same swirling/gliding motion. One problem with this method is the resulting "cleaned" surface frequently appears smeared, streaked or clouded. It is more noticeable with a darker color, or shinier counter top surface. To remedy this cloudiness, homeowners may repeat one or more of the foregoing method steps until the counter top "appears" to be clean. Such a cleaning is both time and labor intensive, often requiring use of a large amount of paper towels.

A primary intent of this invention was to create a new tool (and method of use) that can both clean wash and dry a hard, horizontal surface more efficiently and effectively. This hand-held tool combines a sponge/cleaning pad and squeegee at a preferred tilting angle in one comfortably handled trowel arrangement that lets the user of this tool simulate the natural movement action of a hand-held sponge, cloth or paper towel. And by using the squeegee component of this tool, one may more effectively eliminate liquid cleaning residue from a hard-smooth surface. Use of this invention should eliminate the need for frequent repetitions of washing, wiping and drying cycles to achieve satisfactory results.

The handheld combination tool described herein easily glides/swirls on a horizontal hard surface to first wash that surface clean and then dry the same with a quick "flick of the wrist" action. It includes a trowel handle, parallel to the squeegee plane, along with a nonslip grip and sponge-like cleaning pad.

The method for using this tool entails: Step 1 (applying an agent to the surface), Step 2 (washing the whole surface), and Step 3 (drying the surface thereafter). With just one tool that combines a cleaning pad and squeegee with a trowel handle, the user can safely simulate the natural wrist controlled, hand-held swirling/gliding action traditionally associated with surface cleaning using a hand-held sponge, wash rag or paper towel along with a scrubbing action when the orientation of the trowel's cleaning pad is kept flat (or parallel) before flicking one's wrist to engage the squeegee component of this tool, typically at about a 45 degree (or greater) angle, to effect full drying of the cleaned surface with yet another swirling/gliding action thereon.

BRIEF SUMMARY OF THE INVENTION

This invention addresses a combination sponge or cleaning pad and squeegee/wiper assembly suitable for using in a natural wrist-controlled, hand-held action to both wash and dry a hard surface area such as a counter or table top quickly and more efficiently. The cleaning pad/squeegee-wiper are joined together on a trowel with a nonslip, grip handle that extends parallel to the squeegee-wiper component. The cleaning pad extends beneath the trowel base with intentional spacing from the squeegee-wiper attached to one side of that same trowel base.

A preferred option allows for removal and replacement of main components, i.e. either the cleaning pad OR the squeegee-wiper from their trowel base when no longer useful. A method for using this combination cleaning pad/squeegee drying trowel is also disclosed.

BRIEF SUMMARY OF THE DRAWINGS

Further features, objectives and advantages will become clearer with the following Detailed Description made with reference to the accompanying drawings in which.

DESCRIPTION OF PREFERRED EMBODIMENTS

Referring now to the drawings, there is shown several embodiments of device, according to the invention. In the accompanying drawings, common elements are commonly numbered in the respective views. For the alternative embodiment shown, common elements are consistently numbered though in the next hundred series.

When cleaning a countertop or tabletop surface, three functional steps should always be practiced. They consist of: Step 1, applying a water-based liquid or foam cleaning agent (solution) onto the surface. That agent may include one or more soaps, disinfectants, dryers, sealers and/or polishing-agents. Next, Step 2 distributes the cleaning agent over the whole surface area with a scrubbing and/or wiping action. Step 3 entails drying the scrubbed/wiped surface to remove remnants of the previously applied agent plus any foreign matter removed from the surface by said scrubbing/wiping action. Finally, optional Step 4 calls for using a disinfecting wipe, i.e., a paper product saturated with a quick drying, evaporation solution, to wipe down the whole surface one last time before discarding after use.

For household kitchen and/or bath sink (vanity) countertops, the typical cleaning method consists of: Step 1a, spraying or wiping onto the surface a cleaning agent/solution, polish and/or disinfectant; Step 2a, distributing the applied cleaner about the whole of the using a handheld wet or dry sponge, washrag or paper towel; Step 3a, drying the washed surface with a handheld paper towel or a rinsed, then wrung out, semi-dry sponge or washrag; and Step 4, optionally, using a disposable disinfecting wipe there over, said wipe being a paper product saturated with a quick drying evaporation solution.

A Good Housekeeping® Seal label recommends product warranty and selection of use for various cleaning agents, etc. Their targeted audience is for household users. Some examples include: dishwasher safe, microwave safe, disinfected wipes and/or cleaners for kitchens or baths.

For restaurants and bars, the typical method for cleaning food preparation areas, dining areas (countertops OR tables), and/or restrooms is practiced per certain mandated protocols. Such directives may even be quite specific as to the preferred cleaning product(s), tools and methods to be used thereon. One representative method entails: Step 1b, applying a cleaning and/or disinfecting solution to the surface to be cleaned, that application may further specify spraying a specific solution over the surface OR wiping solution thereon using a properly rinsed/wrung-out micro cloth or micro paper towel. Next, Step 2b uses a handheld, wet, properly rinsed AND wrung out micro cloth or paper towel to further distribute solution over the whole of the surface being cleaned. Step 3b dries the washed surface using a handheld, properly rinsed and wrung out micro-cloth (or alternately, a semi-dried/dried micro paper towel). Once more, this MAY be followed by an optional Step 4 in which a disinfecting wipe/paper product saturated with an evaporating solution can be used for one final wipe down and then discarded.

Public venues, for manufacturing, business, retail, medical, food processing, supermarkets and the like may have their own protocols dictating "best practices" and/or cleaning standards. Such protocols may specify which type of cleaning agents, cleaning-pads, drying-pads and tools to use when practicing one or more of preceding Steps 1, 2, 3 and 4. They may further detail how the foregoing cleaners and/or cleaning tools must be stored when not in use, handled, cleaned before reuse and/or properly disposed of Some inspections and record documentation may be required in this regard by certain Federal, state and/or local governmental health agencies. For instance, it may be commonly stipulated that certain locations and/or surfaces in those locations use a "one time then discard" micro paper for one or more of the foregoing cleaning Steps 1 though 4.

The United States Department of Agriculture USDA and Federal Food and Drug Administration FDA approve which materials can be used and where. One preferred cleaning material, acceptable to both the USDA and FDA, is a polypropylene from an injection-molding process that could effectively fuse handle to holder thereby creating a one-piece unit that would prevent/eliminate any bacteria hibernation thereon. Polypropylenes also won't absorb water and most grease petroleum products, detergents, sanitizers or solvents.

NSF International labeling endorses independently run tests and audits while also certifying trainers and consultants for food safety. Their targeted audience for food preparation use include certain regulations on how to apply, clean or dry materials that may be coarse in structure like a sponge or scrubber that can harbor and transfer harmful residue from one place to another. Still other directives address materials, such as paper microfiber, for use in applying, cleaning and drying surfaces, either one-time before discarding or only reusing after a proper wash out and sanitizing. Ideally, handled cleaning tools should be selected that are either made from non-absorbing materials, or easily washed and cleaned, with mostly smooth surfaces that reduce or eliminate small openings-cavities thereabout. In some cases, cleaning or prep tools in food preparation or surface cleaning are purposefully color-coded to identify (as a further safeguard) those tools best used "only for" resistance to bacteria, including *salmonella* or *E-coli*, contaminations.

For the present invention, component materials may not necessarily be currently Good Housekeeping Seal and/or NSF certified for household use. However, attempts of meet the stated endorsement requirements of both organizations is a short-term objective.

The invention comprises a combination cleaning pad and squeegee/wiper in a trowel-handled assembly, purposefully angled so as to perform certain maneuvering cleaning processes/methods. Particularly, when the cleaning pad of this device has been previously saturated to absorb a cleaning agent/solution, it may then be engaged with the cleaning surface to perform applying Steps 1, 1a or 1b, along with follow up Steps 2, 2a or 2b.

When the cleaning-pad of this tool engages with the cleaning surface AFTER that surface has been sprayed with or had an amount of cleaning agent poured onto it, the device may be properly used to perform washing Steps 2, 2a or 2b. When the squeegee-wiper component of this combination tool engages with the aforementioned cleaning surface, it is used to perform drying Steps 3, 3a or 3b. Either way, this invention achieves a properly cleaned counter or table top surface with improved time efficiencies and also reduced waste of otherwise disposed of paper products.

When using any squeegee-wiper, there may be a small amount of residual moisture lines left behind where one squeegee path does not fully overlap with an adjoining squeegee wipe. If there is a greater overlap of successive squeegee paths, less moisture lines will remain. This effect is also seen when using a squeegee to clean window glass. To better overcome this potential problem, one may simply wipe away residue moisture lines using a dry paper towel or cloth. Otherwise, one may not be able to achieve a 100% cleaning via Step 3.

Use of this combination tool results in a natural wrist-controlled, cleaning action with a comfortably-handled trowel that can closely simulate the swirling/gliding motion of a handheld sponge, washcloth or paper towel over a horizontal surface. Drying (Step 3) uses the squeegee-wiper when this trowel tool is pivoted from cleaning agent distribution to drying with its nonslip handle grip that accommodates quick and easy, back and forth volleys by the flick of the wrist.

After completing the cleaning Step with this invention, it is recommended to hand wipe the surface with a dry paper towel or cloth to: (i) absorb any remnant cleaning agent puddles and (ii) remove any wet moisture lines. This use of a secondary drying step requires lesser amounts of change-outs, replacing wet paper towels or cloth with a dry one.

In a household trial, an L-shaped, granite kitchen counter top (10 feet by 5 feet) with a double sink basin required more than one change-out of a dry paper towel when performing a drying step without using the invention. The average number of paper towels required to dry 100% was between four and five. But when the invention was used, only one paper towel was needed to dry (Step 3) to 100%. As such, use of this invention can be expected to decrease paper towel use from four or five to one, a savings of at least 75%. In addition to needing fewer materials (paper towels), there is a time and labor savings with use of the present invention.

Drying time (Step 3) was reduced by at least 50% with no smearing, cloudy appearance or streaky residue.

This combination trowel tool would also be useful when cleaning horizontal floor surfaces, or on-your-knee applications. One tool can still do it all with little smearing or streak residue.

The cleaning-pad component of this trowel combination can perform a Step 1 distribution of cleaning agent, then a Step 2 surface washing to lift, soften or degrade foreign matter on that counter or table top surface. The squeegee-wiper component is then used to perform a Step 3 drying that will remove remnant cleaning agent plus any loosened foreign matter that may gather in small puddles on the surface along with moisture lines left behind should this squeegee-wiper not fully overlap sweeping paths/tracks.

In one embodiment, the cleaning-pad component of this invention is permanently fixed to the underside of the trowel with critical spacing from its adjacent squeegee-wiper component. In another variation, it is removable from the main trowel handle. The cleaning-pad comprises of a moisture-retaining material like a sponge, cloth, or paper product often used to wipe counter or tabletops. Preferably, the cleaning-pad further includes a scrubber element that may be used when cleaning requires a more aggressive material.

The relative thickness of this cleaning-pad component is critical. It must NOT be so large as to restrict drying with the attached squeegee. The degree of spacing between squeegee-wiper and cleaning-pad can be varied to decrease the chance interfering with squeegee drying action. Particularly, the thicker the cleaning-pad, the greater the space needed between that pad and the tool's adjoining squeegee-wiper.

In the fixed model of this tool, the cleaning-pad is permanently attached with a waterproof adhesive to the underside of the trowel base. This is more likely in a household version of the invention. Elsewhere, where NSF certification requires more of a "one-time" use before discarding (to safeguard against bacterial cross contamination), an alternative variation would employ a removable cleaning-pad attachment means, like one that uses a matching set of hook-and-loop fasteners (or Velcro®) on the trowel underside. In that instance, the temporarily attached cleaning-pad component would have the ability to be "changed-out" with either a totally new replacement or a previously removed, but then sufficiently cleaned (and sterilized) prior pad model. In the latter case, that recycled pad has been duly washed-out, a process which may include using dishwater detergent in a sink basin or a dishwasher-safe detergent in an actual dishwasher. Such reuse of changeable pads, "over and over", would give the household version of this invention more of an economical benefit/advantage. But it would NOT be useable in an NSF certification setting.

Figure 5A:
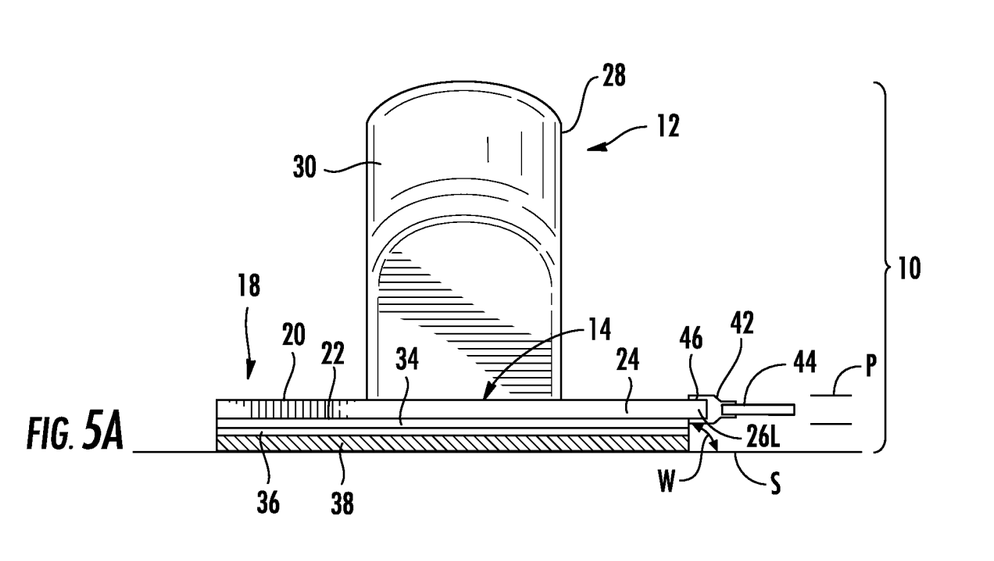
FIG. 5A is a front axial plan view of the trowel from FIG. 1 shown in operation wetting clean a hard surface such as a counter or tabletop.

The squeegee-wiper component of this device can either be fixed or removable from one side of the trowel handle. Ideally, this squeegee-wiper element would extend at less than a 10 degree angle, more preferably about 0 degrees—or substantially in the same plane as the main body of the trowel the base, perpendicular to the trowel's handle. (See, washing angle W in FIG. 5A.) This squeegee-wiper component would consist of a soft, rubber-like material of low durometer that is commonly used in drying house and car windows. In a preferred version, this squeegee-wiper would sit in a channel affixed to the trowel body in such a manner as to allow periodic removal and replacement with other wipers when too worn for further use.

The preferred trowel handle of this device would have two flat surfaces, one on each side, extending purposefully perpendicular the trowel base for achieving a comfortable yet firm hand grip while still enabling a flick-of-the-wrist control. Some known trowel handle designs are rounded, or relatively thin and flat in shape/cross-section. Operator hands, especially when not fully dry, may have a tendency to slip from such prior art handles. For this invention, it may even be more suitable to add a multiple fingertip pattern to the inside/underside of this device's handle component. It is also preferred that the handle of this invention be unidirectional, or suitable for use by either the left OR right hand of its operator with the squeegee-end being positioned away from the user's hand/wrist.

Preferred embodiments of this device's handle require affixing to the trowel base at two points, one laterally forward of the other. Handles affixed at just one point may be used but are not preferred. If the invention were to use a single attachment style handle, it could not be easily held for both left and right-handed operators (or "switch-hitters"). A "switch hitter" may feel more comfortable turn his/her trowel handle around 180 degrees. But in doing so, the squeegee orientation with respect to the rest of the hand will be reversed, i.e., not away from the hand. Operation of this invention prefers manipulation of the squeegee away from the user's hand/wrist.

The method using this trowel-handled device has two pivoting orientations. Handheld-wrist control is critical to achieve these orientations. To accomplish proper handheld pivoting-control, grip squeezing of the trowel handle should NOT slip. It is critical to the operation of this invention that proper handle holding allow for relatively easy back-and-forth pivoting between washing and drying steps.

An optimum application of cleaning agent and/or washing is achieved when the trowel of this device is held relatively flat. That allows the cleaning-pad component to best engage with the surface to be cleaned at an angle of less than 10 degrees, more preferably at a 0 degree angle relative to the plane of the trowel base.

Figure 6:
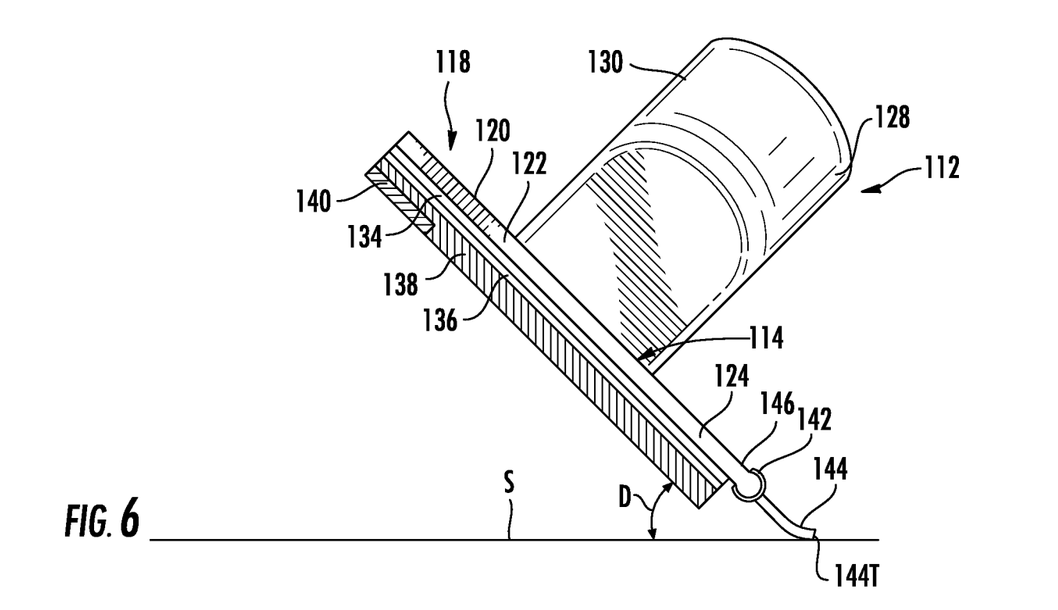
FIG. 6 is a front axial plan view of the same trowel from FIG. 5B shown at its preferred angle to wipe dry the cleaned hard surface.
Figure 7:
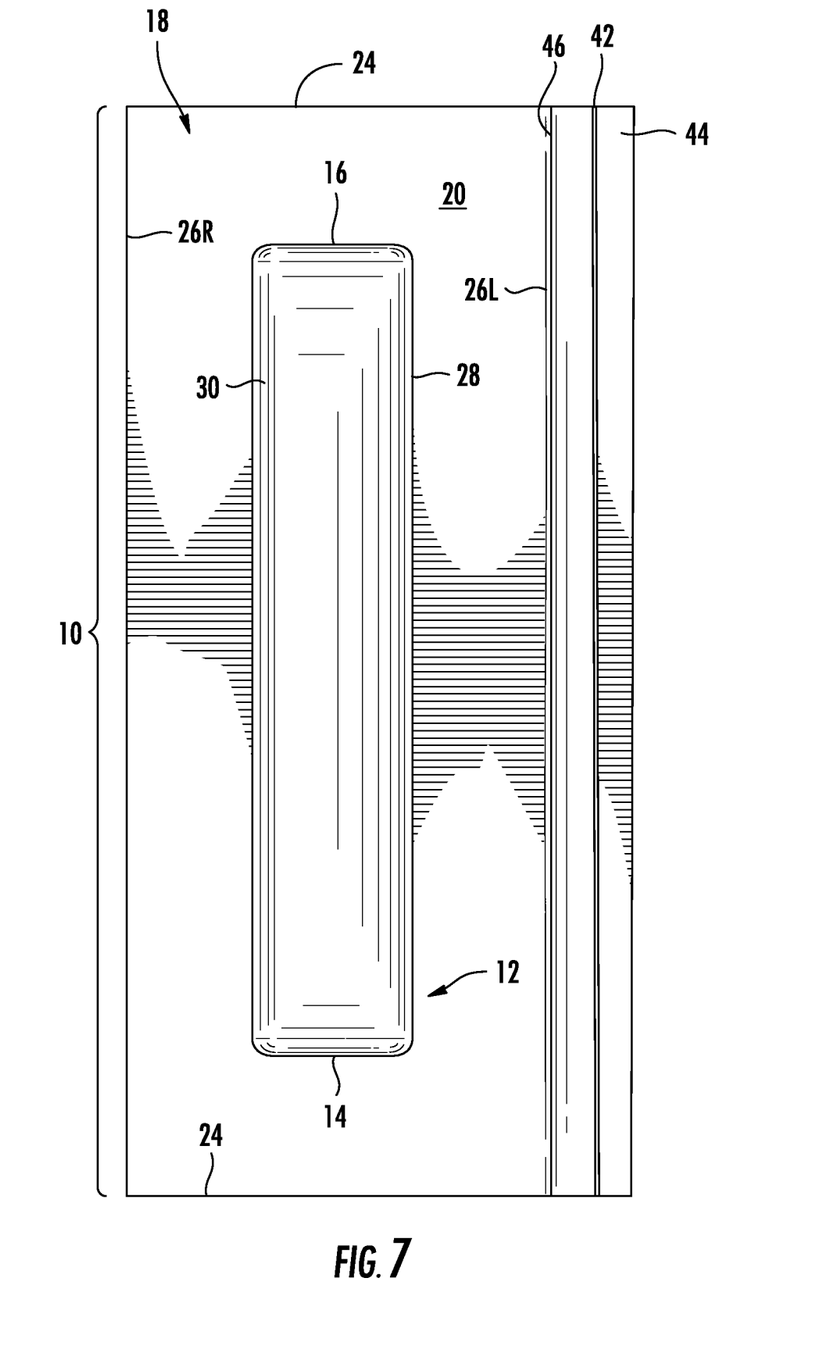
FIG. 7 is a top plan view of the trowel combination from FIG. 1.

Optimum drying is achieved when this same trowel handle is tilted between 0 and 90 degrees, or preferably at the commonly used angle (item D in FIG. 6) between about 40-75 degrees (or preferably about 45 degrees) for squeegee-ing. Such angling optimizes the drying accomplished with a flick-of-the wrist engagement between squeegee-wiper and cleaned counter top surface S. In FIG. 6, you'll note that some of the durometer inclusive with wiper component 144 actually causes it to tail slightly upward (see, item 144T) when drying the surface S. But in no event does any portion of the The preferred tilt of trowel handle may vary with individual users. The goal is to control tilting at what is the most effective angle for the operator. For instance, too small of an angle, closer to 0 degrees, may cause the wiper to drag and not adequately dry; whereas too large of a tilt, or at an angle closer to 90 degrees, may cause the wiper to skip and not adequately dry. When the trowel does not drag or skip, the user has found the "sweet spot". By prior experience/experimentation/exercise, it is recommended that a first time user start drying at an angle between about 0 and 90 degrees. That drying angle may change to affect the best/optimum drying of a cleaning surface as the hand/wrist action glides thereover. It should be noted, however, that when the invention is used further away from its user, i.e., where the user is reaching, the drying angle will tend to decrease closer to 0 degrees. And, when the invention is used nearer its user who is not reaching or extending his/her arm, the drying angle tends to increase—closer to about 90 degrees.

The most preferred, effective tilt angle for the trowel is between about 45 and 90 degrees. Another factor to consider for optimum angling, however, is the relative hardness of the squeegee's wiper material. Particularly, a softer (low durometer) wiper material will have less of a propensity to drag or skip whereas a harder (high durometer) material will show a greater propensity to drag and skip. The invention uses softer (low durometer) wiper blade material. That aids in the flick-of-the-wrist pivoting action needed to operate over a broader degree of wiper angles with the surface to be dried.

Referring now to the accompanying FIGS. 1, 3-4, 5A and 7, there is shown a first embodiment of device, generally 10, consisting of a C-shaped handle 12, affixed at a front end 14 and rear end 16 to a flat (or planar), rectangular-shaped trowel base 18. Note, that the C-shaped handle 12 allows for easy access for either left or right-handed usage. As shown, base component 18 has an upper surface 20, lower surface 22, front and rear edges 24 and two lateral (left OR right) sides 26L and R.

Trowel handle 12 consists of two substantially parallel, flat sides 28 and 30 with a plurality of finger recesses, indents or markings 32 (for assisting with better gripping during use). The alternate embodiments shown at FIGS. 2, 5B and 6 have no finger recess equivalents. These handle sides are intentionally planar AND run substantially parallel to one another for comfort during use (i.e., better ergonomics on the wrist and hand of its user-operator).

Figure 8:
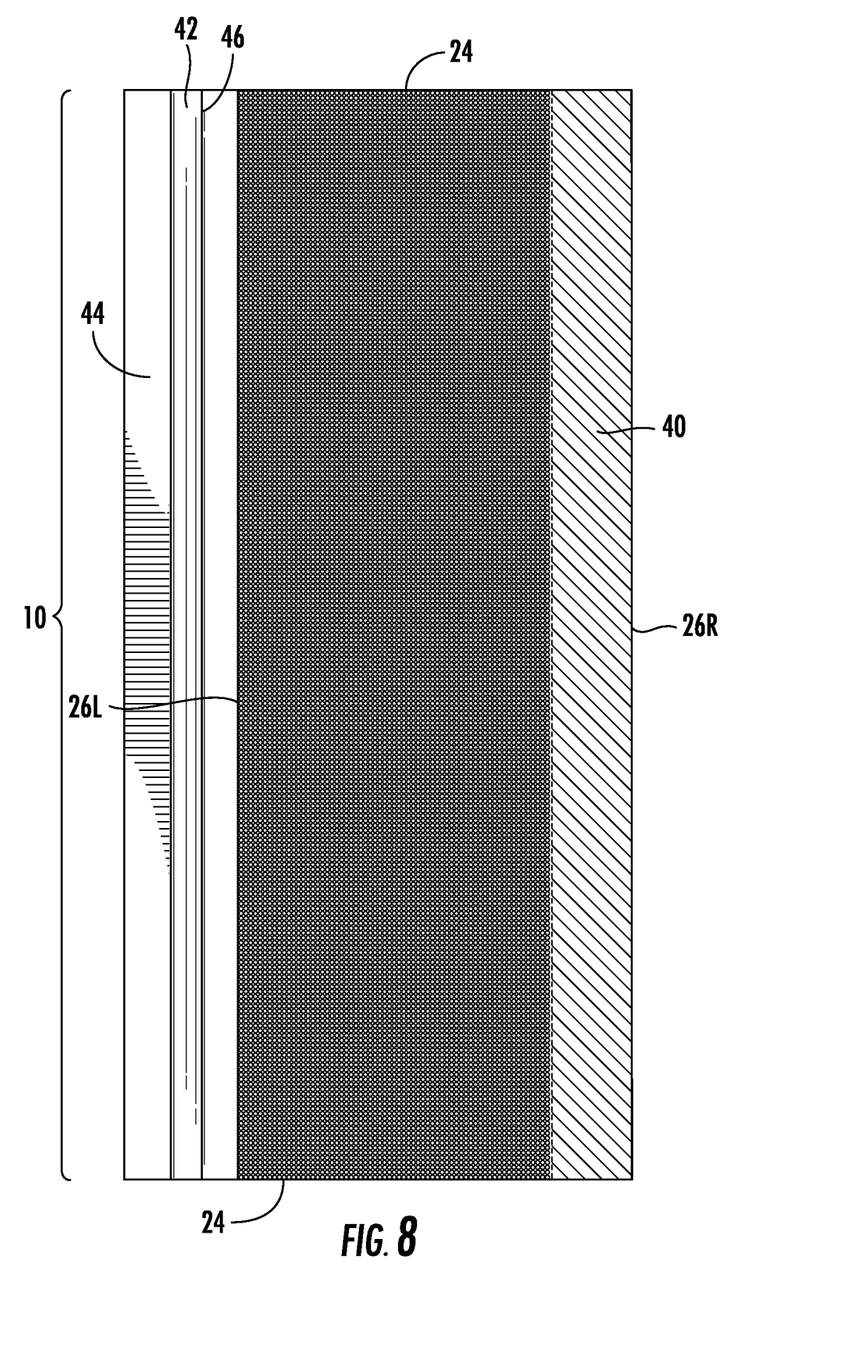
FIG. 8 is a bottom plan view of the trowel combination from FIG. 7 with optional scrubber section included.

To the bottom, or lower surface 22 of the trowel base 18 having a removable, replaceable sponge bottom, there is affixed a section of hook-and-loop fastening tape 34, or Velcro®. The tape meshes with its matching other half, item 36 (either hook OR loop). Tape 36, in turn, is attached to a main cleaning-pad component 38 that is either repeatedly removable and periodically replaceable, or permanently affixed to the underside of base component 18, depending on the given model of this invention. Cleaning-pad component 38 makes up the main surface applying and wiping area of this combination tool. In a preferred variation, cleaning-pad component includes an optional scrubber section (item 40 in FIG. 8 and 140 in FIGS. 5B and 6) for hard-to-clean areas of a counter or tabletop.

Along one lateral edge (26L is shown, for illustration purposes), there is attached wiper channel 42. It may be made integral with the main body of trowel base 18 or affixed to it thereafter. Wiper channel 42 is meant to house (either permanently, or temporarily—for removal and replacement when worn out, depending on the model) a main squeegee-wiper component 44. Preferably, squeegee-wiper component 44 is made from a low durometer, rubber material for greater flexibility and for better drying capabilities therewith. Depending on the relative thickness of cleaning-pad component 38, there will need to be some adjustment to the wiper holder component 46 between main elements: cleaning-pad component 38 and squeegee-wiper component 44 so that the latter makes significant contact with the washed surface needing to be dried with said squeegee-wipe with a flick-of-the-wrist motion of the device on the counter or tabletop surface. Ideally, unless integrally formed as part of the right edge 26L to upper surface 20 (as part of a more "limited duration"/use, more quickly disposable alternative variation), a wiper holder component 46 would still allow for periodic removal and replacement(s) of squeegee-wiper component 44.

Note, there are several key angles to this invention. First, for user comfort, handle 12 affixes to trowel base 18 at a substantially perpendicular angle of ninety (90) degrees. There is no angle (per se) between the trowel base 18 and both the cleaning-pad component 38 attached to the underside, lower surface 22 of trowel base 18 AND to the wiper channel 42 from which main squeegee-wiper component 44 outwardly extends. In other words, all of these run parallel to one another rather than being purposefully angled one relative to the other(s). And, most importantly, the plane of general operation for the squeegee component of this invention is intended to run PARALLEL (or at least substantially parallel) with the combination's trowel base 18 and sponge (or cleaning pad component 38 attached to the underside thereof) as indicated by the parallel lines P in FIG. 5A. At the same time, this same squeegee component is meant to extend PERPENDICULAR to the combination's working handle as seen by Washing Angle W in FIG. 5A.

When used for applying cleaning agent to the flat, planar surface S of a counter or tabletop per this invention, then distributing that cleaning agent about said planar surface S, it is preferred that cleaning-pad component be kept at a 0 degree Washing Angle W relative to that planar surface S. This is in contrast to the preferred tilt angle for using the squeegee-wiper component to subsequently dry the cleaned surface S with the present invention. In the latter case, Drying Angle D is preferably kept between 0 and 90 degrees, more preferably between about 40 and 75 degrees.

Figure 1:
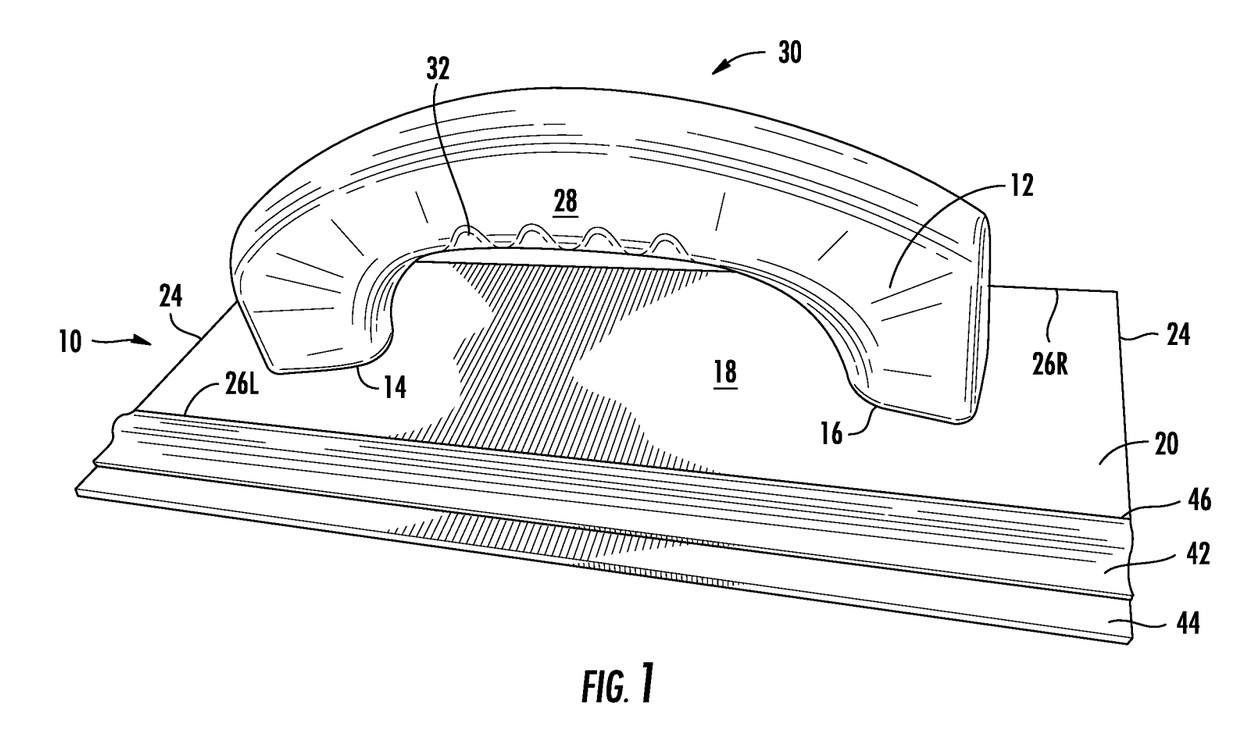
FIG. 1 is a top perspective view of one embodiment of trowel combination according to this invention.
Figure 2:
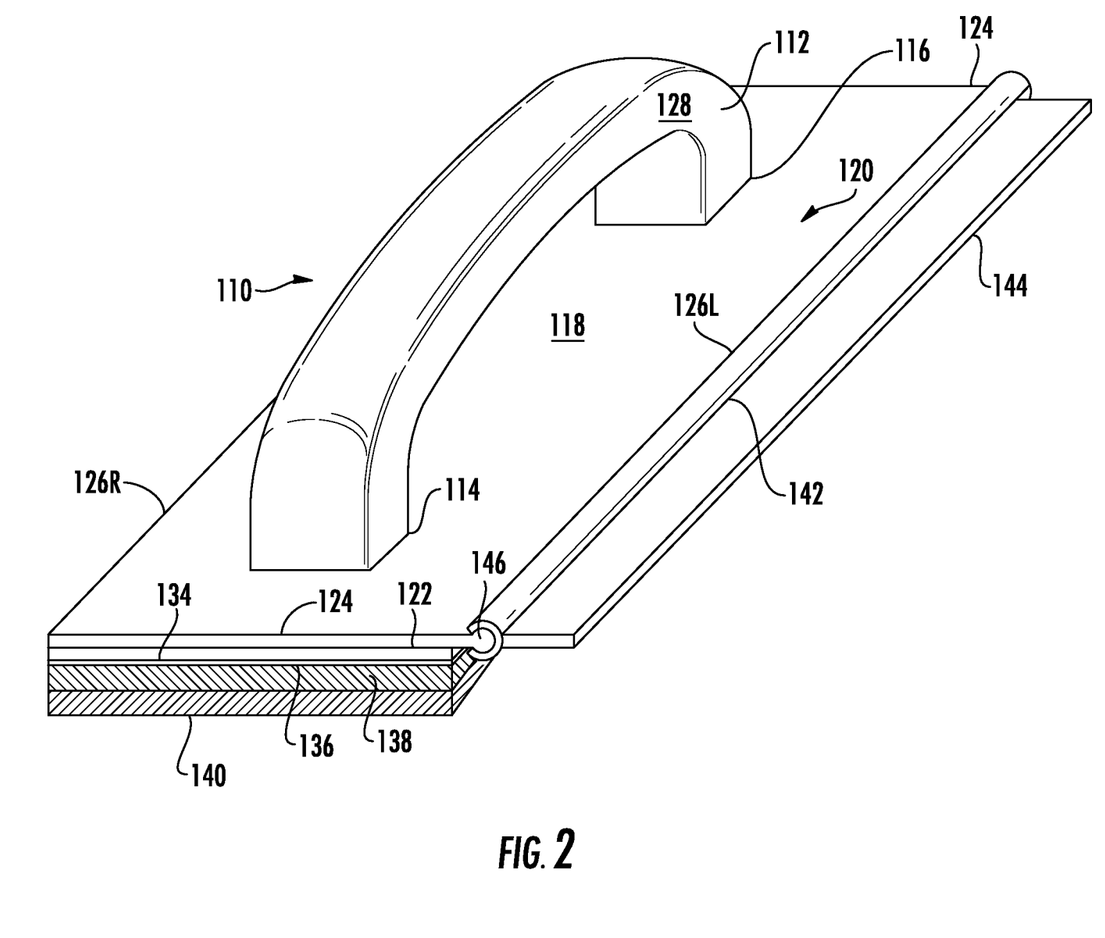
FIG. 2 is a front perspective view of a second embodiment of trowel combination (shown with no finger recesses or indents into its main handle element)
Figure 3:
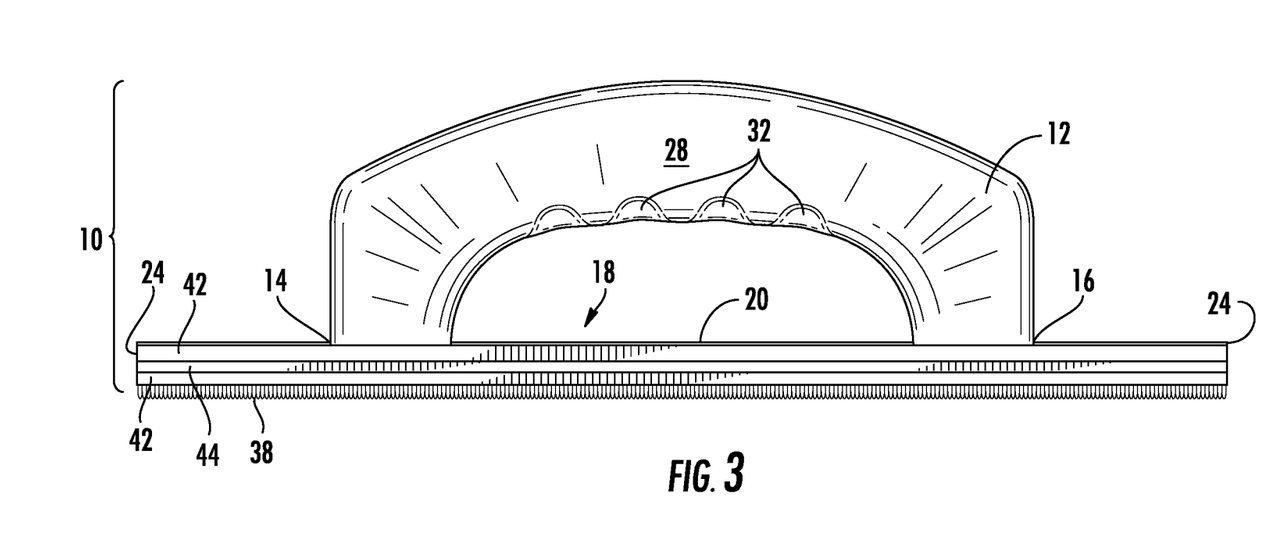
FIG. 3 is a left plan view of the trowel combination from FIG. 1.
Figure 4:
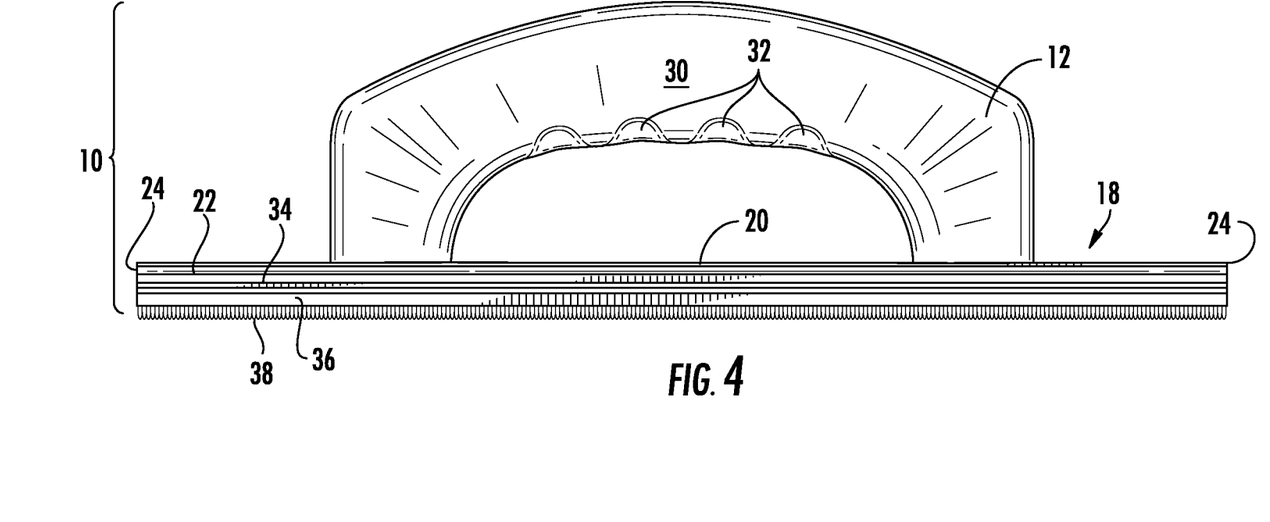
FIG. 4 is a right plan view of the same trowel combination, or opposite view from that seen in FIG. 3.
Figure 5B:
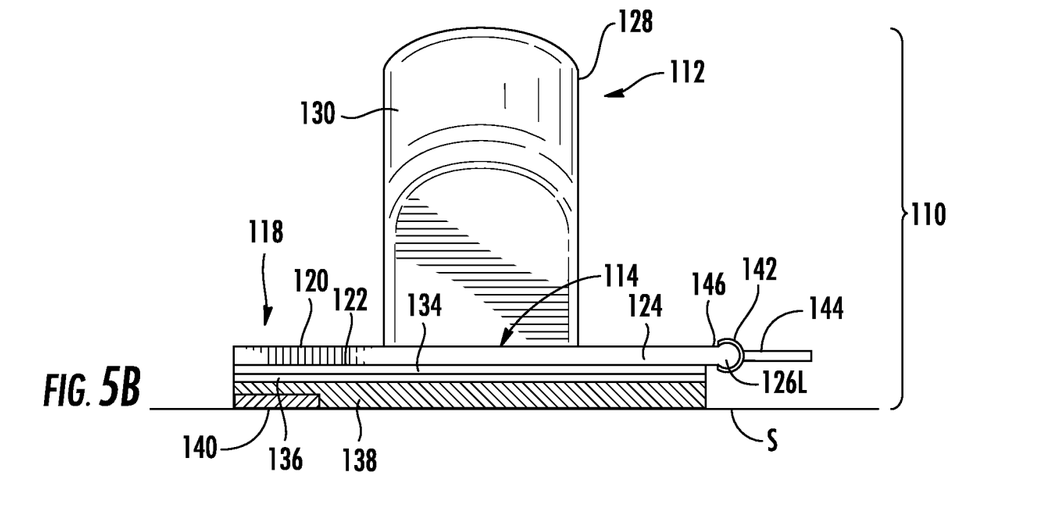
FIG. 5B is a front axial plan view of the trowel from FIG. 2 shown wetting clean a hard surface such as a counter or tabletop.

For the second embodiment depicted in accompanying FIGS. 2, 5B and 6, there is shown another variation of cleaner-dryer combination device 110, once more consisting of its own predominantly C-shaped handle 112, affixed at a front end 114 and rear end 116 to a flat (or planar), rectangular-shaped trowel base 118. Note, that the C-shaped handle 112 allows for easy access for either left or right-handed usage. As shown, base component 18 has an upper surface 120, lower surface 122, front and rear edges 124 and two lateral (left OR right) sides 126L and R.

Trowel handle 112 consists of two substantially parallel, flat sides 128 and 130, this time with no "optional" finger recesses, indents or markings. To the bottom, or lower surface 122 of the trowel base 118 having a removable, replaceable sponge bottom, there is affixed a section of hook-and-loop fastening tape 134, or Velcro®. The tape meshes with its matching other half, item 36 (either hook OR loop). Tape 136, in turn, is attached to a main cleaning-pad component 138 that is either repeatedly removable and periodically replaceable, or permanently affixed to the underside of base component 118, depending on the given model of this invention. Cleaning-pad component 138 makes up the main surface applying and wiping area of this combination tool. Optionally, a scrubber section (item 140) may be incorporated therewith.

One of the main differences between first and second embodiments of this preferred combination surface cleaner-dryer is the means by which Applicants' wiper component attaches to the body proper of their device. In FIGS. 2, 5B and 6, it is more clear how its integral wiper channel 142 holds its main squeegee-wiper component 144 from one horizontally extending end while connecting, via a rod and clip arrangement, at its opposite end 146.

Having described the presently preferred embodiments, it is to be understood that this invention may be otherwise covered by the scope of one or more appended claims.

What is claimed is:

1. A combination cleaning pad and squeegee wiper tool for cleaning and drying a counter or table top, said tool comprising:
    (a) a handle component attached to a flat base component at opposed ends of the handle component;
    (b) a cleaning pad component at least temporarily adhered to a bottom surface of the flat base component;
    (c) a channel extending along one lateral side of the flat base component; and
    (d) a squeegee wiper component that extends from the channel at an angle substantially parallel to the flat base component, said cleaning pad component being spaced a set distance from the squeegee wiper component for enabling the squeegee wiper component to dry the counter or table top in a swirling motion without interference from the cleaning pad component.

2. The combination cleaning pad and squeegee wiper tool of claim 1 wherein the handle component comprises a pair of substantially flat sides that extend substantially parallel to one another.

3. The combination cleaning pad and squeegee wiper tool of claim 1 wherein the handle component includes a plurality of finger gripping indentations.

4. The combination cleaning pad and squeegee wiper tool of claim 1 wherein the handle component is made from polypropylene.

5. The combination cleaning pad and squeegee wiper tool of claim 1 wherein the handle component and the flat base component are integrally formed.

6. The combination cleaning pad and squeegee wiper tool of claim 1 wherein the cleaning pad component includes at least one scrubbing element.

7. The combination cleaning pad and squeegee wiper tool of claim 1 wherein the cleaning pad component permanently adheres to the bottom surface of the flat base component.

8. The combination cleaning pad and squeegee wiper tool of claim 1 wherein the cleaning pad component removably attaches to the bottom surface of the flat base component for replacement with another cleaning pad component.

9. The combination cleaning pad and squeegee wiper tool of claim 1, which is adapted for drying the counter or table top by tilting the squeegee wiper tool at an angle greater than 0 and less than about 90 degrees.

10. The combination cleaning pad and squeegee wiper tool of claim 9, which is adapted for drying the counter or table top by tilting the squeegee wiper tool at about a 40 to 75 degree angle relative to the counter or table top.

11. The combination cleaning pad and squeegee wiper tool of claim 1, which further includes one or more hook-and-loop tape strips for attaching the cleaning pad component to the bottom surface of the flat base component.

12. A trowel device for cleaning a counter or table top then rotating to dry the cleaned counter or table top, said device comprising:
    (a) a handle component attached to a rectangular-shaped, planar base component, said handle component attaching at opposed ends to the planar base component;
    (b) a replaceable cleaning pad component at least temporarily adhered to a bottom surface of the planar base component;
    (c) a channel extending along one lateral side of the planar base component, said channel adapted for holding a squeegee wiper component that can be swirled about to dry the counter or table top; and
    (d) the squeegee wiper component at least temporarily extending from the channel at an angle substantially parallel to the planar base component and at an angle substantially perpendicular to a centerline through the handle component, said cleaning pad component being sufficiently spaced from the squeegee wiper component so as to not interfere with the squeegee wiper component when the device is used for drying the counter or table top by tilting the device at an angle greater than 0 and less than about 90 degrees relative to the counter or table top.

13. The trowel device of claim 12 wherein the handle component and the planar base component are integrally formed.

14. The trowel device of claim 12 wherein the cleaning pad component includes at least one scrubbing element.

15. The trowel device of claim 12, which is adapted for drying the counter or table top by tilting the squeegee wiper component at about a 40 to 75 degree angle relative to the counter or table top.

16. The trowel device of claim 12 wherein the squeegee wiper component may be removed from the channel and replaced with another squeegee wiper component.

* * * * *